(12) United States Patent
Isaacson

(10) Patent No.: US 7,007,266 B1
(45) Date of Patent: Feb. 28, 2006

(54) METHOD AND SOFTWARE SYSTEM FOR MODULARIZING SOFTWARE COMPONENTS FOR BUSINESS TRANSACTION APPLICATIONS

(75) Inventor: Cory Isaacson, Broomfield, CO (US)

(73) Assignee: Quovadx, Inc., Englewood, CO (US)

( * ) Notice: Subject to any disclaimer, the term of this patent is extended or adjusted under 35 U.S.C. 154(b) by 466 days.

(21) Appl. No.: 10/044,659

(22) Filed: Jan. 8, 2002

(51) Int. Cl.
G06F 9/44 (2006.01)

(52) U.S. Cl. .................. 717/100; 717/115; 717/120; 719/320; 715/763

(58) Field of Classification Search ........ 717/100–103, 717/115, 120; 709/200–203; 719/310–313, 719/320, 328; 715/744, 760, 762, 763, 961, 715/964, 968
See application file for complete search history.

(56) References Cited

U.S. PATENT DOCUMENTS 6,104,874 A * 8/2000 Branson et al. ............. 717/108
6,647,396 B1 * 11/2003 Parnell et al. .............. 707/102
6,701,514 B1 * 3/2004 Haswell et al. ............. 717/115
2002/0069273 A1 * 6/2002 Bryant et al. ............... 709/223
2002/0184301 A1 * 12/2002 Parent ........................ 709/203
2003/0050972 A1 * 3/2003 Felt et al. ................... 709/203

* cited by examiner

Primary Examiner—Antony Nguyen-Ba
(74) Attorney, Agent, or Firm—Sheppard, Mullin, Richter & Hampton LLP

(57) ABSTRACT

A system for modularizing a business application, the system including a computer having a first computer-readable medium encoded with a browser and an application server. The browser manages a user presentation interface for the business application and is configured to support client-side scripting. The application server is coupled to the computer and includes a second computer-readable medium that is encoded with a server-side script processing engine for processing scripts submitted by the browser and a Module Controller Servlet for opening, closing and managing at least one Module associated with the business application. A Module is a dynamic, configurable software element which includes at least one Extension component and a Data Store. The Extension component defines at least one particular business method function associated with the business application and is invoked as required by the business application. The Data Store includes at least one associated data set which contains data associated with the business application.

13 Claims, 6 Drawing Sheets

```xml
<?xml version="1.0"?>
<fw:module ID="genSample"
    className="com.compuflex.framework.gui.GenericModule"
    name="Employee Admin" type="gen"
    xmlns:fw="http://www.compuflex.com/framework/2.0">

<!-- Provide an optional server-side openScript. -->
  <fw:openScript ID="openScript"/>

<!-- Define the dataStore which will be used by the module. -->
  <fw:dataStoreDef ID="dataStoreDef"
className="com.compuflex.framework.xmldatastore.XmlDataStoreGenericImpl">

<!-- Specify each dataSet to open within the Module. -->
    <fw:dataSet ID="dsEmployee" descriptor="dsEmployee.xml"
name="dsEmployee"/>
    <fw:dataSet ID="dsDepartment" descriptor="dsDepartment.xml"
name="dsDepartment"/>
  </fw:dataStoreDef>

<!-- Specify any Module Extension classes to instantiate. -->
  <fw:moduleExtensions>
      <fw:moduleExtension ID="demoExtension"
      className="com.compuflex.framework.demobeans.DemoExtension"/>
  </fw:moduleExtensions>
</fw:module>
```

FIG. 5

METHOD AND SOFTWARE SYSTEM FOR MODULARIZING SOFTWARE COMPONENTS FOR BUSINESS TRANSACTION APPLICATIONS

FIELD OF THE INVENTION

The invention relates to the development of computer applications. More specifically, the invention relates to a method and software system for modularizing the components used in developing business transaction applications.

BACKGROUND OF THE INVENTION

Typically, business transaction applications designed for use over the Internet or a local intranet are developed using a three-tier architecturally layered approach. The three-tier approach utilizes a User Presentation Layer, an Application Server layer, and a Data Source Layer.

First, the User Presentation Layer is designed to provide an end-user interface to the application. This interface is usually configured in a graphical format and is typically provided via a web browser. The browser itself has limited processing capabilities, and has the primary task of rendering visual images on virtual pages, known as web pages, to the end-user via a graphical display such as a computer monitor. The information for rendering these images are brief instructions provided in hypertext markup language (HTML). The browser receives these HTML instructions and renders the end-user interface. In business applications, the browser preferably displays individual transaction records in list, form, or tree formats, and such records may be comprised of one or more fields of information such as product, price, color, and availability.

The Application Server Layer uses an application server which provides all processing of business application data, including processing user input from the User Presentation Layer, performing required business logic, and updating or retrieving business transaction data from back-end data sources.

The Data Source layer is comprised of back-end database systems or services which have the responsibility of storing and managing business transaction data. This data is most often stored, or can be represented, in a tabular format, consisting of rows and columns. These rows and columns are ultimately presented to or received from the User Presentation Layer as records (rows) and fields (columns).

The typical design requires each individual Web page interface to be supported by one or more individual software components. These components respond to user events, perform business logic processing, and interact with various back-end database systems. Using commonly accepted object-oriented programming techniques, a developer must manually design and produce each of these components. In addition, the developer must define unique command keywords in the form of a URL (Uniform Resource Locator) to be sent by the Web Browser to the application server for interpretation and execution. These command keywords must be manually linked to specific software components and methods within those components.

Assume a user wants to write an application for displaying Order data from a single table, one record at a time. Traditional software techniques require that computer code be written to incorporate the following procedures.

Data access software code must be separately written for reading and writing from/to the database table, including code for capturing the field input from the page, and providing the field output for a given Order record.

The code for the actual JAVA Server Page which incorporates and utilizes the data access code to work with the Order data must be separately written.

Individual coding for defining any actions required by the page, and associated action keywords which tell the data access component which action to perform. Each of these action keywords must be defined by the developer, and interpreted by the data access component. Assuming a simple Ordering application, the minimum required actions for this screen are Insert (insert a new Order into the table), Update (update an existing Order), Delete (delete the Order), Next (show the next Order record from the Order List), Prior (show the prior Order record from the Order List).

This must be done for each individual page in the entire application. As functionality and data increase, the amount of code which must be written to fully support the application increases dramatically. Accordingly, the drawbacks to the traditional approach, especially when considering large-scale applications, are as follows:

A) Such systems can require design and development of many hundreds of application software components. These components are time consuming to develop, and the resulting complexity from such vast numbers of objects makes support or modification of the application slow and error prone.

B) Developers must design and develop their own action keywords with which to control application function, a task that is tantamount to designing a simple programming language. This is both time-consuming and problematic, as naming conventions must potentially accommodate hundreds or thousands of such keywords.

C) Because each Web page is bound to a specific set of distinct software components, modifications in the user presentation mandate modifications to the underlying objects. These objects therefore limit application flexibility, and each change requires the supporting object program code to be modified, recompiled, tested and re-deployed to the application server. These tasks are error prone and cumbersome, especially within large developer groups.

D) User interface designs must be rigorously analyzed and detailed prior to development, as the dependency between Web pages and supporting software objects is both rigid and complex. This constraint limits the flexibility of the user presentation, extending delivery times required for accommodating user requests.

In short, the generally accepted object-oriented design concepts result in highly complex applications, composed of hundreds or thousands of software components, and thus require extensive design and development resources to construct, debug, maintain and enhance.

One proposed solution to the problem is to rely on a code generation program to automatically produce a majority of the components in such a system based on business rules specified by the developer. While such a program can output machine generated software components which approximate some portion of the system requirements, developers must still examine, modify and maintain many of these components to meet specific business processing needs. Further, such a solution does nothing to reduce the complexity and number of required software components, and in fact can result in an even greater number of components which are inherently less efficient than those designed and developed by software engineers.

SUMMARY OF THE INVENTION

The present invention provides a new Module-Centric organization of software objects. The invention adheres to basic object-oriented design principles; but, greatly improves on this paradigm through a new innovation which allows developers to design and construct comprehensive large-scale objects, called Modules. A single Module is in effect a virtual software object, configured and assembled at runtime. The Module is designed to support all facets of an entire business application process. The Module provides unsurpassed flexibility for design of the user interface, as any required data which is defined as part of the Module can be presented to or captured from the user from any presentation page, without rigid links between these user interface screens and specific software components. This feature greatly reduces design analysis and effort, allowing developers to work directly with end-users to rapidly design, produce, and modify the presentation interface, without time-consuming software component coding changes.

In addition, the Module allows developers to directly access custom business logic components which they design and develop, without the need to develop and link specific action keywords to invoke the processing methods of these components. This feature enables virtually unlimited extension to accommodate even the most complex business processes, giving developers free access to all user data, data source data, and any other capabilities inherent to the application environment (such as access to other systems or capabilities which may reside outside the domain of the business application).

The end result is a highly efficient business application, composed of a small number of total components, and with only a select few of those components required to be manually designed and coded by the developer. Moreover, the components the developer is required to design and construct are those that are most crucial to system success, and therefore bring a greater return on development efforts. Accordingly, the final application is greatly simplified in design, without compromising business requirements. This approach allows developers to concentrate on the important task of defining and coding specific business processes, rather than construction and maintenance of the voluminous objects normally needed to support less important tasks.

DESCRIPTION OF THE DRAWINGS

FIG. 5 illustrates a sample Module Deployment Descriptor in accordance with a preferred embodiment of the present invention.

DETAILED DESCRIPTION OF PREFERRED EMBODIMENTS

Figure 1:
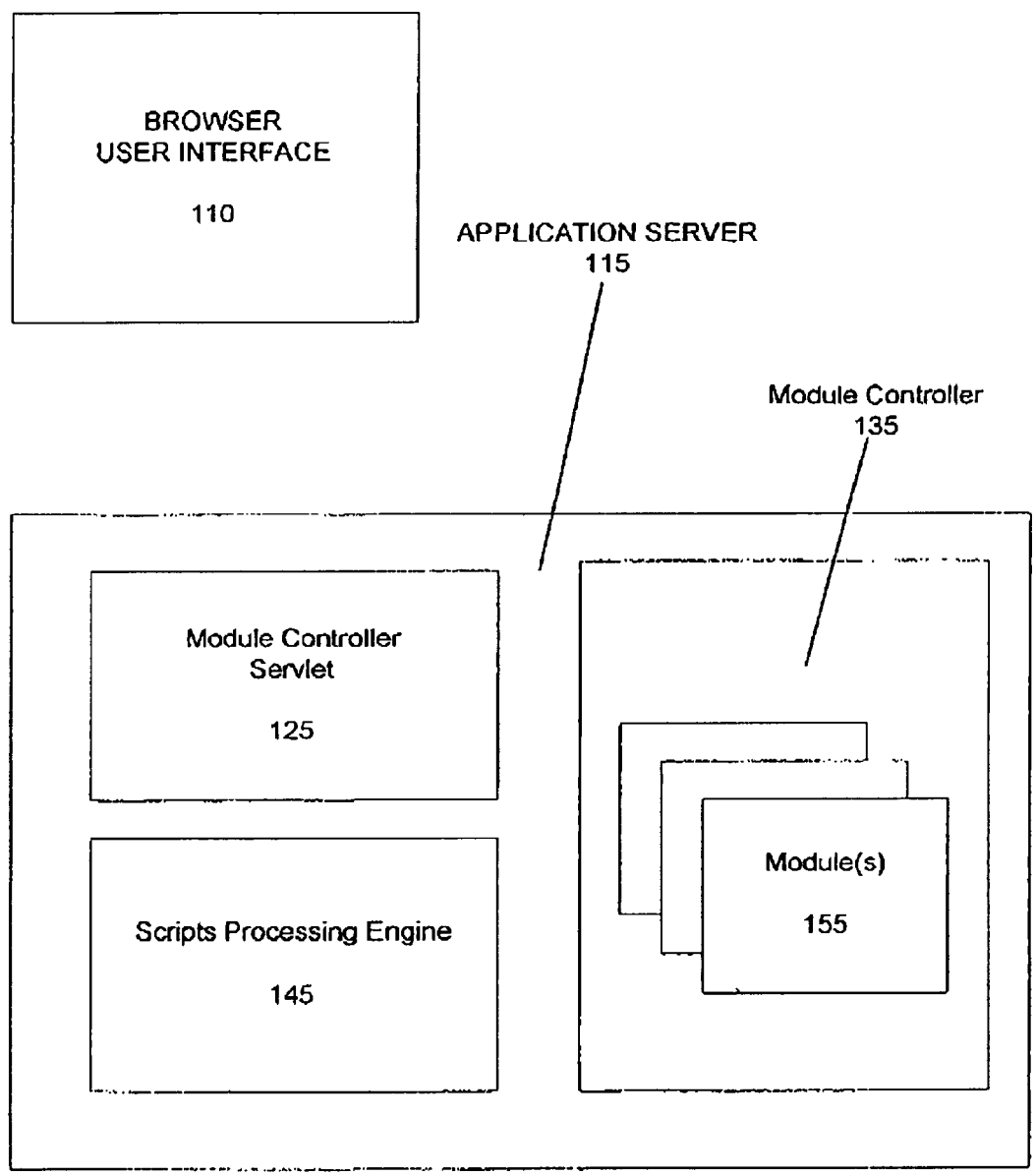
FIG. 1 is a functional block diagram which illustrates the components of a system in which a preferred embodiment of the present invention is implemented.

FIG. 1 is a functional block diagram which illustrates the components of a system in which a preferred embodiment of the present invention is implemented. As shown, the system includes a browser 110, implemented on a local pc or computer terminal, and an application server 115 which is coupled to the local pc or computer terminal.

The browser 110 may be any type of conventional web browser program, which interprets HTML language, such as Microsoft Internet Explorer or Netscape Navigator. The browser is used to render pages generated or served by the application server 115. Preferably, the browser supports a client-side scripting language, such as JavaScript™. This language is used to manage the user presentation interface (such as respond to button clicks by the user). A client-side scripting language is also used to develop server-side scripts, which are sent to the application server for processing, and which in turn invoke business logic processing. In a preferred embodiment, the browser supports the following functions:

Display Application Data—Application data is displayed to the user, typically in the list, entry form, or tree format.

Capture User Entry—The user can enter data into an HTML form, which is then sent to the Application Server when the Browser page is submitted.

Process User Events—User events, such as a button click, are processed locally by the Browser. It can also be used for simple validation of field entries made by the user.

Server-side Scripts—The Module architecture uses the JavaScript™ processor running in the Browser, to generate Server-side Scripts. These scripts define one or more invocations of methods resident in the business application components running on the server. This capability is detailed later, and is a key capability of the invention.

All business application components within and relating to a Module reside and operate within the context of an application server 115. In a preferred embodiment, the application server is a conventional product available from any one of various vendors, such as IBM's WebSphere Application Server.

The browser communicates with the application server using the HTTP (Hyper Text Tranport Protocol) protocol. The browser receives generated HTML pages from the application server. It then submits these HTML pages, with the inclusion of user input data, to the application server for processing. The application server then processes the submitted pages, performing any server-side processing requested, and then returns an HTML result page. It is during the page submit process that Module processing takes place.

In the case of a JAVA-compliant application server, the server processes Java Server Pages (JSP), a widely supported and used language for developing dynamic HTML pages which include business information. Using JSP, developers can incorporate Java language elements into JSP pages, which are pre-processed by the application server, prior to returning the response page to the browser. The end result after pre-processing is always an HTML page which the browser can interpret and render.

As further illustrated in FIG. 1, the application server 115 includes a Module Controller Servlet 125, a Module Controller 135, and a Script Processing Engine 145. Preferably, these are all implemented in software and all reside on the application server 115.

The Module Controller Servlet 125 manages Module instances in response to application events. The Module Controller Servlet opens and closes Module instances, via the Module Controller 135. A single instance of the Module Controller Servlet 125 is required for each Web application.

The Module Controller 135 opens, closes and stores instances of each Module. One instance of the Module Controller is instantiated and stored in each user session (i.e., one session per user). In a preferred embodiment, the Module Controller manages instances of the Module for a given user only.

The Script Processing Engine 145 is a general facility used by all Module instances for processing server-side scripts submitted by the browser. Accordingly, the Script Processing Engine 145 is able to support multiple threads or instances per application. The Script Processing Engine interprets string representations of programming language calls, and executes these strings as if they were actual calls written in the language itself. The capabilities of the Script Processing Engine allow developers to dynamically invoke any type of business application processing required, directly in response to user events in a browser. These include standard supported processing functions (such as saving or retrieving application data), as well as invocation of methods within custom extension components constructed by the developer, which have been registered by the Module. A single instance of the Script Processing Engine 145 is instantiated for the entire application, and supports all processing requirements in response to server-side scripts submitted by the browser.

In the present invention, the Module is the central component of the software system, and is designed to perform many of the common tasks required of business applications. The Module is a comprehensive virtual object, supporting an entire business process, as opposed to a single minute portion of that process. A Module is adaptable and configures itself at runtime according to developer specifications. One Module is instantiated for each user running a particular business process, and a user may have more than one Module open at a time (to provide concurrent support of several unique business processes if required). Each Module instance supports a complete set of user interface screens related to the business process, and each user interface screen can access any data, or perform any process defined within the Module. The Module and its capabilities are described in further detail hereinafter.

Figure 2:
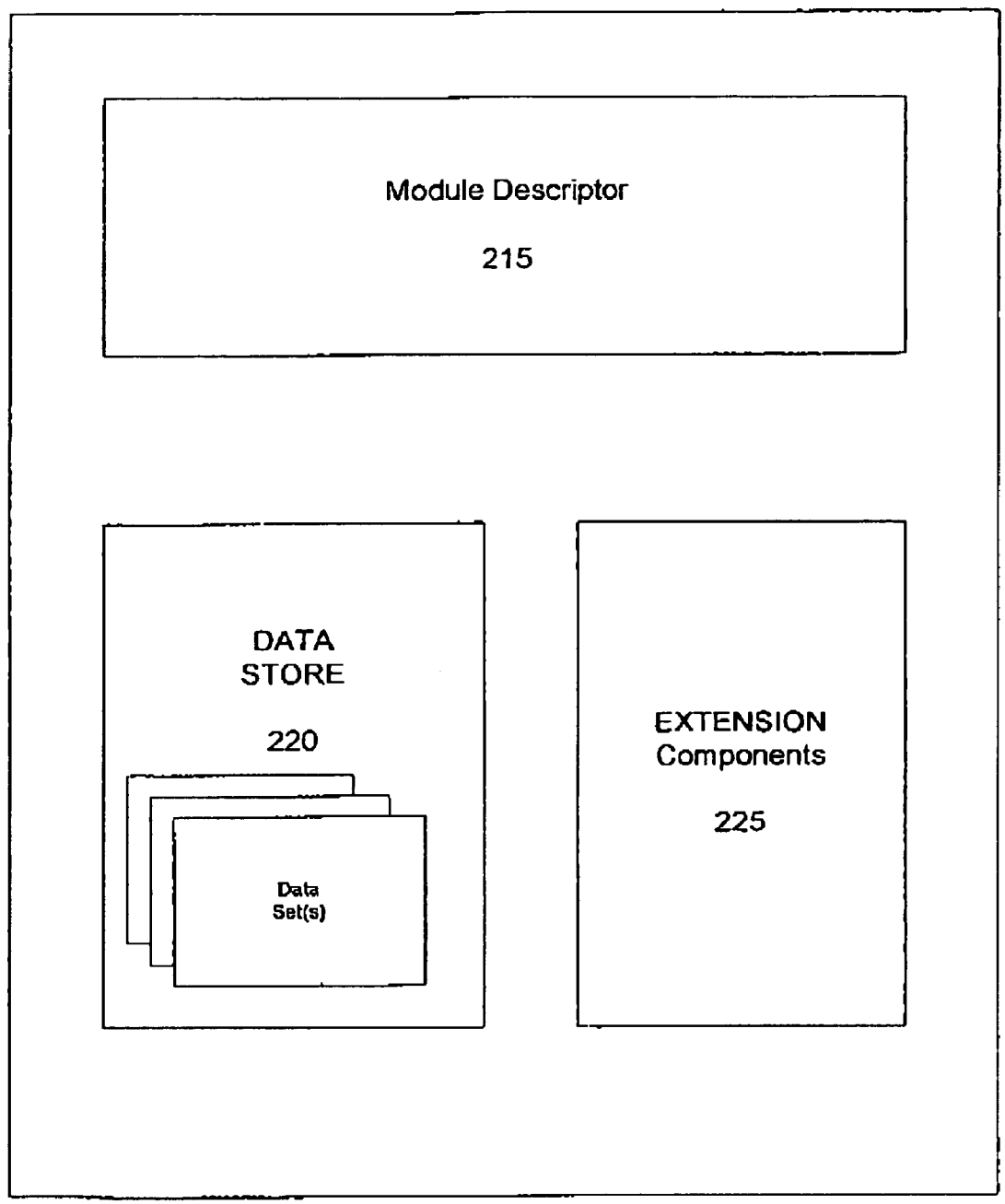
FIG. 2 is a block diagram which illustrates the individual components of a module in accordance with a preferred embodiment of the present invention.

FIG. 2 is a block diagram which illustrates the individual components of a Module in accordance with a preferred embodiment of the present invention. As explained earlier, the Module provides the infrastructure for managing the complete business process. As illustrated in FIG. 2, the Module preferably includes several functional components, including a Module Deployment Descriptor 215, a Data Store 220, and any Extension components 225.

The Module Deployment Descriptor 215 is an XML document, as specified by the developer, which defines the Module configuration. The Module Deployment Descriptor is executed at run time in order to configure the Module as specified. This adaptable nature of the Module is key to greatly reducing the number of components required for designing a Web-based business application. The Module Deployment Descriptor is created by the developer, using an XML editor, or a special utility program. The Module Deployment Descriptor describes each data set to be included in the Data Store of the Module. The structure and function of the Data Store is described further hereinafter. The Module Deployment Descriptor also specifies any custom Extension components associated with the Module. The application server reads the Module Deployment Descriptor, and then dynamically configures the Module to contain the data sets and Extension components required.

As illustrated in FIG. 2, the Module also contains and manages a Data Store 220. The Data Store is a relational object which manages all business application data access required by the Module. The Data Store is also an adaptable component, which preferably has its own XML deployment descriptor to define its runtime configuration. A Data Store contains one or more data sets, each which represent a certain type of relational data required by the business process. Each Data Set provides a working buffer for application data. Preferably, the data is retrieved from a back-end database or data source, modified by the user, and automatically updated to the back-end database or data source by the Data Store. All data inside a single data set is organized in rows and columns, emulating a relational database, which allows the Module to easily modify or set values in a particular row/column of a given data set. The Data Store and its data sets provide a single standard component which replaces any number of data access components required by a traditional object-oriented application.

The Module 210 also contains one or more Extension components 225 which are coded by the developer to support specific business logic requirements and functions. These components provide code for supporting specified business functions that are associated with the Module. For example, the developer may write an Extension component for committing product to fulfill an order. Extension components have full access to the Module environment, including any user parameters, all associated data sets, and any other functions supported by the application server. Accordingly, in the order fulfillment example, an Extension component designed to commit product to fulfill an order would require access to inventory data sets, customer data sets, and order data sets.

Methods defined within Extension components are preferably invoked by component/method name through server-side scripting submitted by the browser in response to user actions. Because methods on Extension components are invoked by component/method name, it is very convenient and simple for developers to code and utilize these methods. No special mapping is required, and the Module automatically instantiates an Extension component when it itself is initialized.

The Module performs many standard processing actions automatically. In a preferred embodiment, the standard processing functions performed by the Module include:

Retrieve User Parameters—The Module automatically retrieves all user parameters, as submitted by the HTML input from a given user page. Each user parameter is interpreted by name, using the naming scheme: [data set name]-[column name]

Once the parameters are retrieved, they are forwarded by data set and column name to the Data Store.

Manage Data Store—The Module automatically creates a single instance of a Data Store. The Data Store contains one or more data sets, each of which provide a buffer of application data (in the form of rows and columns)

which has been retrieved from a data source, or entered by the user. As the user makes changes to data in the user interface screens related to the Module, and as these pages are submitted to the application server, the Module transfers the user changes to the correct data set, updating a specific row and column in the buffer for each field in the user interface screen. The Module also manages records within each data set through server-side script commands (such as adding a row, deleting a row, changing the current row position, etc.).

Execute Application Processing—As the user interacts with a user interface screen, various events are triggered. For example, the user may click the 'Save' button, directing the application to save current data. Each of these commands are formulated in server-side script segments, which are then passed to the Module from the browser whenever a page is submitted to the application server. The Module sends the server-side script commands to the Script Processing Engine, where they are processed as Java language commands, invoking the specified method on a given object. These commands can be executed using standard Module components (such as adding a row to a data set) or utilizing custom Extension components provided by the developer.

Manage Extension Components—The application developer provides business logic processing, by constructing a set of customized Extension components. The Module loads specific Extension component(s) associated with the Module when the Module is instantiated and processes any server-side script commands for a given Extension component. In a preferred embodiment, Extension components have full access to a user session, including access to the Data Store and associated data sets. In addition, Extension components are free to access all available capabilities provided by the application server or the JAVA environment, allowing virtually any type of business logic or other processing to occur.

Display Application Data—The Module provides a facility, through the Data Store component, to display any desired data which is contained in a data set. The data is preferably displayed in fields on a user interface and is preferably accessed by using the data set name, column name, and current row.

Figure 3:
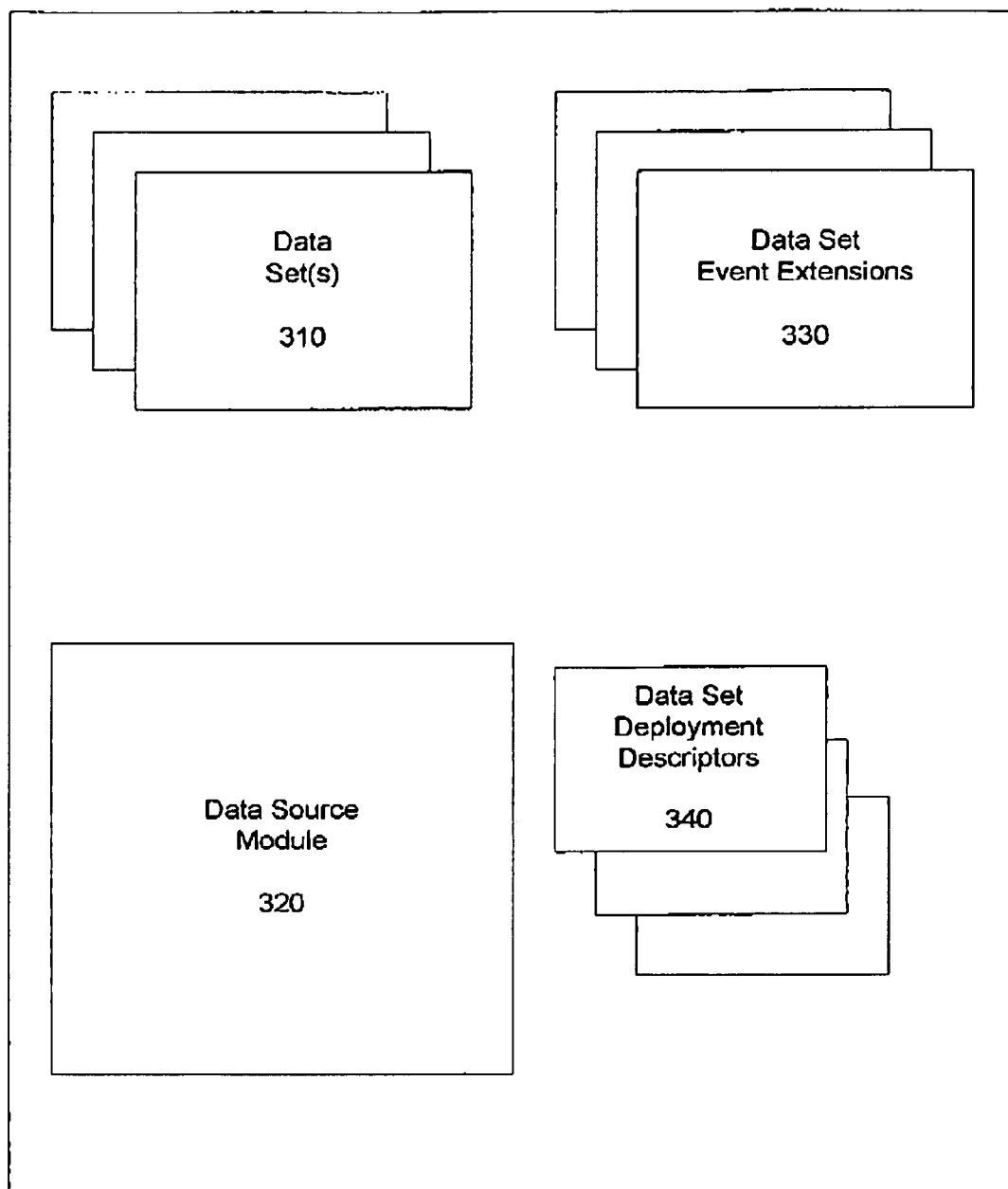
FIG. 3 is a functional block diagram which illustrates the different components in a Data Store, in accordance with a preferred embodiment of the present invention.

FIG. 3 is a functional block diagram which illustrates the different components in a Data Store, in accordance with a preferred embodiment of the present invention. As explained earlier, each Module contains a single Data Store instance, which manages all database data for the Module. As illustrated in FIG. 3, a Data Store includes one or more data sets 310, a Data Source Module 320, one or more Data Set Event Extension(s) 330, and one Data Set Deployment Descriptor 340 for each data set in the Data Store. Each of these elements is described in greater detail further hereinafter.

In a preferred embodiment, each data set 310 stores a particular set of data. Preferably, the data for each data set is stored in a single memory-resident XML document, which is used as a data buffer. It is understood that in a preferred embodiment of the present invention, data sets can be related (such as Parent/Child sets) or they may contain totally independent and non-related data. For example, several data sets may be related to customer information, while other data sets may be related to inventory. Each data set tracks all user changes to the data within the set and provides this information to a Data Source Module 320 for efficient updating of back-end database systems.

As described above, the Data Source Module 320 interacts with a data set and transfers information to/from a data set and to/from a back-end database system. In a preferred embodiment, the Data Source Module has three primary functions which include a connect function, an execute query function, and a save function. These functions are as follows:

Connect—this function allows the Data Source Module to make an appropriate connection to a back-end database system or other type of data source. The connection is preferably made through an implementation of a JAVA interface, allowing developers to build connections to virtually any type of data providing system, including pooled connections if desired. The Data Source Module also has the responsibility for maintaining transaction integrity when data is updated to the back-end system.

Execute Query—this function allows the Data Source Module to retrieve data from a back-end database system and builds the internal XML document used to construct the various data sets in a single Data Store. Accordingly, application data can be sourced from any type of back-end system, so long as that data can ultimately be described in a relational format (rows and columns). In a preferred embodiment, the Data Source Module will only retrieve a small number of rows into a single data set (i.e. somewhere on the order of 10s to 100s of rows).

Save—this function allows the Data Source Module to write to the back-end database. Once row/column data is modified in the data set (usually as a result of user interaction) the Data Source Module has the responsibility of saving all these changes to the back-end database system. User data changes to row/column data are stored in the data set as the changes are made. Data changes can be composed of new rows added to the data set, rows deleted from the data set, or one or more column values updated in a given row or rows. When a Save is requested, the Data Source Module translates user data modifications into efficient updates to the back-end database system.

As further illustrated in FIG. 3, the Data Store includes a developer-coded extension component known as a Data Set Event Extension. A Data Set Event Extension is a component which performs some function upon occurence of a specified event to a specified data set. The developer constructs the Data Set Event Extension and registers it with a particular event. When the event occurs the Data Set Event Extension is invoked and the process or function described in the Data Set Event Extension is performed. For example, a Data Set Event Extension may be verification of an order upon entry of the order. In this example, the event would be the saving of a new order. Before the new order is saved, the Data Set Event Extension is invoked and the order is verified. A Data Set Event Extension is automatically invoked each time the specified event or action to the specified data set occurs.

The Data Store further includes a Data Set Deployment Descriptor for each data set to be included in the store. Preferably, the Data Set Deployment Descriptor is an XML document which provides a high degree of flexibility for such definitions, allowing data sets to work with virtually any type of back-end business application data source. The document describes the relational-like format of the data set, including the column definitions for each result row, links to parent data sets, the back-end database or data source to be used, and any applicable Data Set Event Extensions. The Data Set Deployment Descriptor is used by the Data Store to create each data set specified at runtime.

As explained earlier, the Data Store is designed and configured to interface with a back-end database or data source via the Data Source Module. In a preferred embodiment, a Data Store is designed and configured to work with virtually any type of business application data source, including relational databases (such as DB2, Oracle), mainframe systems (VSAM, IMS), procedural interfaces (COBOL procedures), or Web services (SOAP, etc.). All interactions are transparently handled with back-end systems through the Data Source Module.

Module Initialization

Figure 4:
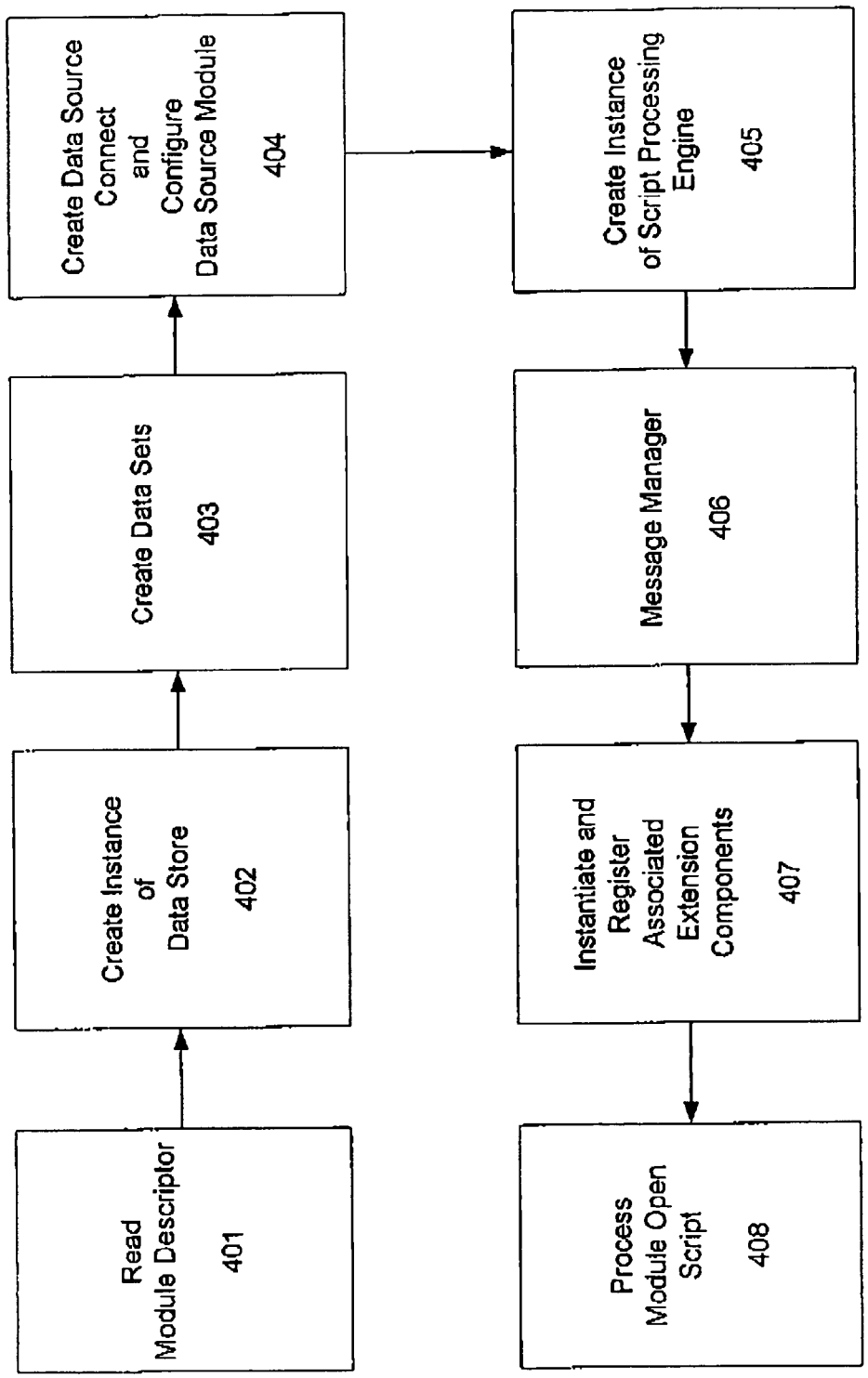
FIG. 4 is a flowchart which illustrates the process flow for creating a Module using a Module Deployment Descriptor in accordance with a preferred embodiment of the present invention.

Modules are created and initialized using a Module Deployment Descriptor which is an XML document which defines the Module and its contents. FIG. 4 illustrates a flow chart which shows the process flow for creating a Module using a Module Deployment Descriptor in accordance with a preferred embodiment of the present invention.

When a user first accesses one of the Modules asscociated with the current application, the Module configuration information for that Module is read from its Module Deployment Descriptor (401). Using information in the Module Deployment Descriptor, the Module then creates an instance of a Data Store (402) and the Data Store in turn creates each data set, as specified, for the Data Store (403). The Module then creates a data source connection and configures the Data Source Module to interact with specified databases and/or data sources (404). The Module then obtains a reference to an instance of the Script Processing Engine (405), which supports requests for all open modules in an application.

As further illustrated in FIG. 4, a message manager is then created to control the return of process results and/or the return of any error messages to the browser (406). The Module then instantiates and registers any associated Extension components, as defined in the Module Deployment Descriptor (407). Finally, the Module open script is processed if one is included (408). The Module open script is optionally defined by the developer within the Module deployment descriptor, and is used to invoke any required business logic processing methods when the Module is first opened.

Module Deployment Descriptor

FIG. 5 illustrates a sample Module Deployment Descriptor in accordance with a preferred embodiment of the present invention. The Module is initialized based on the configuration information contained in the XML Deployment Descriptor document. As shown in FIG. 5, the sample Module Deployment Descriptor defines a Module named 'genSample'. The Module Deployment Descriptor further provides the following configuration information:

- The Module Deployment Descriptor specifies the class to use when instantiating the Module. Note that Modules can be extended by the developer if desired to support custom functionality.
- Provides server-side script commands which should be interpreted and processed once when the Module is initialized.
- Specifies the Data Store to be instantiated by the Module, including the Data Store class name. Note that developers can create their own Data Store implementations if desired.
- Specify each Data Set to create within the Data Store. Any row/column element from any Data Set can be accessed from any JAVA Server Page which references the Module.
- Specify any Module Extension classes to be instantiated by the Module. These Extension classes are constructed by the developer, and the Module automatically exposes all public methods of a given Extension class to server-side scripts. The methods of an Extension class are invoked using the format:
  '[instanceName].[methodName]([parameterValue, [parameterValue] . . . ])'

The instance name is defined as the ID attribute of the moduleExtension element, and the className attribute specifies which class to instantiate.

Module Processing

In a preferred embodiment, the Module is designed to supports several standard processing steps which are commonly required in business applications. Each process step is detailed in this section. All Module processing is invoked when any Java Server page which references the Module is retrieved from the application server. In a preferred embodiment, a method referred to as processModule is invoked by each JAVA Server Page just before it is returned to the browser, performing all required Module processing. In a preferred embodiment, the method referred to as processModule is a general purpose method which captures any user data and executes any specified server-side scripts which have been passed to the page, before the page is passed back to the browser.

Figure 6:
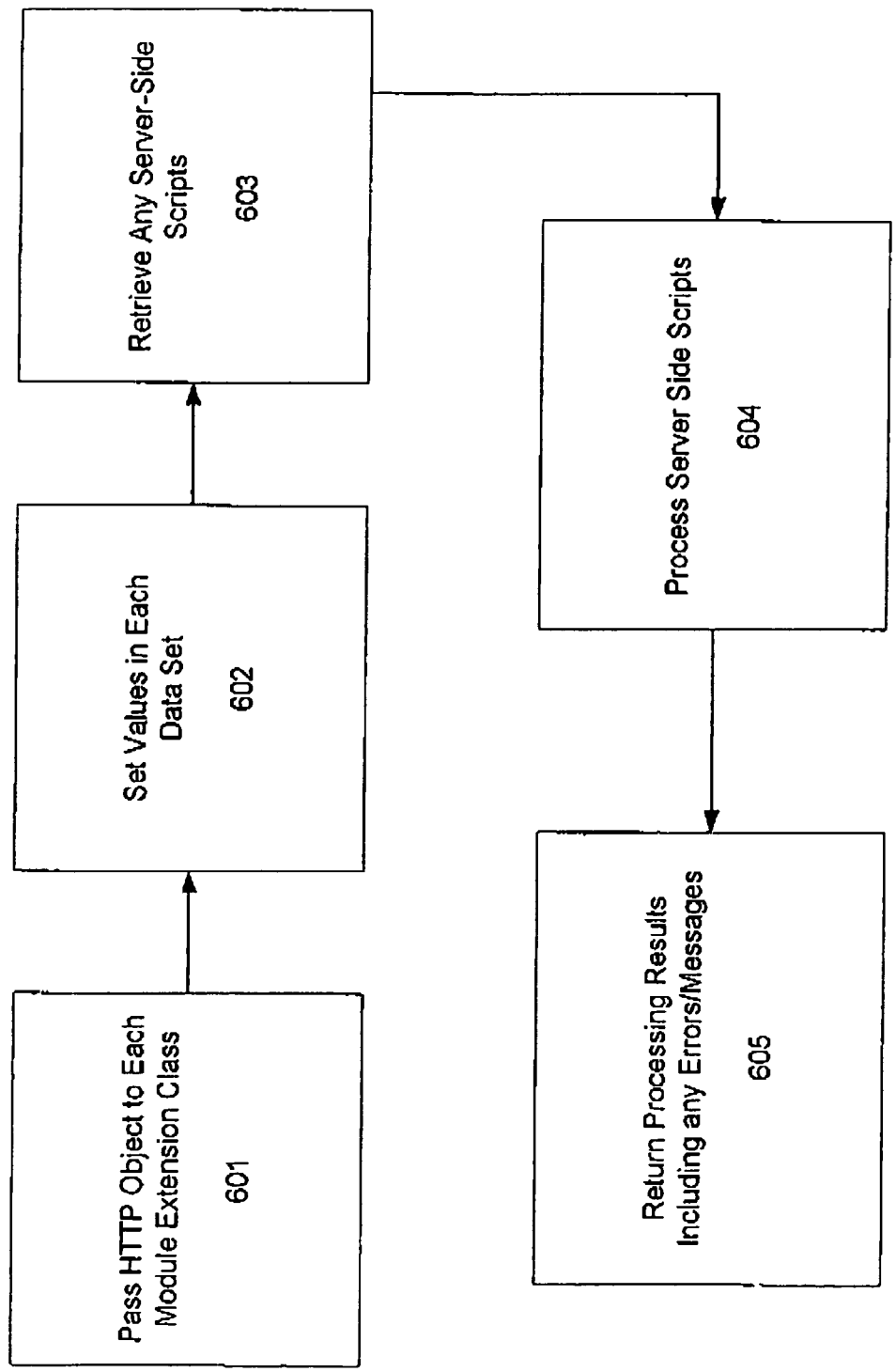
FIG. 6 illustrates the standard processing steps which occur each time the application server invokes the processModule method in accordance with a preferred embodiment of the present invention.

FIG. 6 illustrates the standard processing steps which occur each time the application server invokes the processModule method in accordance with a preferred embodiment of the present invention. When an HTML form on a page is submitted to the server for processing, any values contained within form fields are passed to the server, and a new updated page is requested by and returned to the browser. This is termed a Form 'submit' and corresponding Page Request in HTML and JAVA Server Pages application terminology. The application server then encapsulates all field parameters contained within the form, along with other information about the request into an HTTP request object. This request object is included as a parameter to the processModule method, and the Module uses the request object to obtain data values modified by the user.

As described earlier, the Module processModule method is preferably always invoked at the top of any requested Java Server Page. When the Module processModule method is executed, it performs the steps shown in FIG. 6. As shown, the Module passes the HTTP request object to each Module Extension component (601), making the request object available to the component so that it can directly access parameter values submitted by the page request. Second, the column values in each data set of the Data Store are updated based on parameter values contained within the request object (602). These parameters are derived by the application server based on values input by the user into fields on the form prior to page submission. Each parameter has an associated name, which is determined by a 'NAME' attribute of the field on the page. Form field values are preferably linked to a specific data set and column by using the following naming convention '[dataSet]-[columnName]'. This can be done using a single field tied to a single data set/column, which updates a single row in the data set; or by using multiple fields, each tied to a singe data set/column, thereby updating multiple data set rows. The latter case makes editable tables possible within a single form, allowing the user to add or modify multiple records within a single page submit action.

In the third step, the Module retrieves any server-side script parameter passed by the HTML page request (603).

The server-side script is a textual message representation of one or more executable method invocations. Server-side scripts can execute methods contained within the Data Store, or those within any Module Extension component registered with the Module. The server-side script is preferably passed to the Module via a special hidden form field entitled 'fwModuleScript'. The Module then passes any server-side script to the Script Processing Engine (604). Finally, the results from the processing of the server-side scripts are returned, along with any error messages (605). In a preferred embodiment, these results are returned by placing them in the value of a special hidden field in the form which is named 'fwMessageText'.

There are several other standard methods which are preferably available within a preferred embodiment of the present invention. Among these are included the following method names and functions:

getXmlDataStore—This method is used to obtain access to a Data Store and update data within one of the data sets associated with the specified Data Store.

setDataSourceContext—This method manages a connection to a back-end database or data source which can be shared among multiple Modules for maximum efficiency.

getMessages—This method is used to retrieve one or more processing messages returned by the Module. In a preferred embodiment, messages can be retrieved in either XML or text formats.

getModuleExtension—This method is used to retrieve the instance of a given Extension component which has been associated with the Module. This is helpful when customized presentation is required. By using the reference returned from this method, the Module Extension instance can be accessed directly from within the JAVA Server Page in order to provide any additional processing needed on the page.

Data Store Processing

As explained earlier, a Module has the responsibility for capturing user field parameters and setting the appropriate row/column values within the appropriate data set. The Module contains the Data Store which holds the data set where the information is to be updated. Preferably, the Module retrieves/displays the row/column values to the user from any data set defined within the Module. In a preferred embodiment, the Module can manipulate the contents of a given data set, using any one of numerous methods, including:

getRowCount—Returns the number of rows that currently exist in the Data Set.

getDeletedRowCount—Get the number of rows pending deletion in the data set (i.e., rows which have been flagged for deletion in the back-end database system).

getColumnCount—Return the number of columns defined in the data set.

sort—Sort the Data Set based on one or more columns. This sort is performed internally within the data set, without returning to the back-end database for a new set of rows.

setRow—Sets the current row pointer within the data set.

setDeletedRow—Sets the current deleted row pointer, allowing developers to access rows within the data set which have been flagged for deletion.

getRow—Get the current row pointer number.

getDeletedRow—Get the current deleted row pointer number.

setNextRow, setPriorRow, setFirstRow, setLastRow—Various methods for manipulating the current row pointer within the data set.

setColumnValue—Sets the value of a column, by name or by column index.

getColumnValue—Gets the value from a column, by name or by column index.

getDeletedColumnValue—Allows a developer to access the value from a column which is contained in a row which has been flagged for deletion, by column name or by column index.

appendRow—Adds a new row to the end of the data set.

insertRow—Inserts a new row before the specified row in the data set.

deleteRow—Flag a row for deletion.

saveAllBuffers—Saves all data sets within the Data Store, within a single database transaction. The order in which data sets are saved can be controlled by the developer, which is necessary for some back-end database systems which automatically enforce referential integrity.

findRow—Find a row within the data set.

registerEvent—Register an Event Extension class with the data set, for automatic invocation whenever the event occurs.

getDataModified—Returns true if data has been modified.

clear—Removes all row data from the specified data set.

getColumnInfo—Returns useful information about a particular column in the current row, such as whether the column has been modified by the user.

getRowInfo—Returns useful information about the current row in the data set, such as any pending back-end database action.

The foregoing description details certain preferred embodiments of the present invention and describes the best mode contemplated for assembling the invention. However, the invention is not intended to be limited by the language used in said above referenced description and is only intended to be limited by the appended claims and any equivalents thereof.

What is claimed is:

1. A system for modularizing a business application, said system comprising:
a computer having a first computer-readable medium encoded with a browser which manages a user presentation interface that is configured to display at least one user interface screen for said business application, the browser configured to support client-side scripting; and
an application server including a second computer-readable medium that is coupled to the computer, wherein the second computer-readable medium is encoded with:
a Module Controller Servlet for opening, closing and managing at least one Module associated with the business application, said Module including:
at least one Extension component which is selected from a plurality of Extension components, each Extension component defining at least one particular business method/function associated with the business application, said Extension component invoked as required by the business application, and
a Data Store having at least one associated data set which is selected from a plurality of data sets containing data associated with the business application,
wherein the Module is configured to prevent the need for a developer to implement a coding change selected from the group consisting of linking the user interface screen to a software component that supports the user interface screen and linking a keyword to the software component; and a server-side script processing engine for processing scripts submitted by the browser.

2. The system of claim 1, where the Module modifies the at least one data set associated with the Data Store as a user makes changes to data associated with the business application via the user presentation interface.

3. The system of claim 2 where the Data Store further includes a Data Source Module which interacts with the at least one associated data set and transfers modifications to the data set to a back-end database.

4. The system of claim 1, wherein the at least one Module associated with the business application further includes a Module Deployment Descriptor which defines the at least one associated data set which has been selected for the Data Store.

5. The system of claim 4, wherein the Module Deployment Descriptor further defines which of the at least one Extension components is selected from the plurality of Extension components for inclusion in Data Store.

6. A first computer-readable medium encoded with a computer program product including computer-readable program code for causing a browser that is encoded in a second computer-readable medium and an application server to manage a business application, wherein the browser is configured to manage a user presentation interface that is configured to display at least one user interface screen for the business application, said computer-readable program code comprising:

code for causing the browser to support client-side scripting;

code for causing the application server to open, close and otherwise managing at least one Module associated with the business application, said Module including at least one Extension component which is selected from a plurality of Extension components, each Extension component defining at least one particular business method/function associated with the business application, said Extension component invoked as required by the business application, said a Data Store having at least one associated data set which is selected from a plurality of data sets containing data associated with the business application, wherein the Module is configured to prevent the need for a developer to implement a coding change selected from the group consisting of linking the user interface screen to a software component that supports the user interface screen and linking a keyword to the software component; and code for causing the application server to process scripts submitted by the browser.

7. The computer program product of claim 6, where the computer program product further includes additional computer-readable program code which configures the at least one Module associated with the business application each time the Module is accessed, said additional computer-readable program code comprising:

a Module Deployment Descriptor which defines the at least one associated data set which has been selected for inclusion in the Data Store.

8. The computer program product of claim 7, wherein the Module Deployment Descriptor defines which of the at least one Extension components is selected from the plurality of Extension components for inclusion in the Module.

9. The computer program product of claim 6, wherein the computer program product further includes computer-readable code designed to modify the at least one data set associated with the Data Store as a user make changes to data associated with the business application via the browser.

10. A first computer-readable medium encoded with a dynamic, self-configurable Module which supports an entire business application process, wherein a user interface screen is associated with the business application, said Module comprising:

a Data Store having at least one associated data set which is selected from a plurality of data sets containing data associated with the business application; and at least one Extension component which is selected from a plurality of Extension components, each Extension components defining at least one particular business method/function associated with the business application, said Extension component invoked a required by the business application;

wherein the Module is configured to prevent the need for a developer to implement a coding change selected from the group consisting of linking the user interface screen to a software component that supports the user interface screen and linking a keyword to the software component.

11. The dynamic, self-configurable Module of claim 10, wherein the Module invokes a thread or instance to a Script Processing Engine encoded in a second computer-readable medium in order to process the at least one business method/function of the at least one Extension component at runtime.

12. The dynamic, self-configurable Module of claim 10, wherein the Module has the capability to read from and write to the at least one data set associated with the Data Store in accordance with user input.

13. The dynamic, self-configurable Module of claim 10, wherein the Data Store further includes a Data Source Module which interacts with the at least one data set and transfers modifications to the data set to a back-end database.

* * * * *